(12) United States Patent  
Bove et al.

(10) Patent No.: US 7,797,332 B1
(45) Date of Patent: Sep. 14, 2010

(54) COMPUTER-IMPLEMENTED METHOD AND DEVICE FOR PROVIDING SECURITY ON A COMPUTER NETWORK

(75) Inventors: Andrew T. Bove, Gaithersburg, VA (US); Ned H. Miller, Leesburg, VA (US); Scott Michael Armstrong, Falls Church, VA (US); Scott Thomas Carpenter, Great Falls, VA (US)

(73) Assignee: Fortinet, Inc., Sunnyvale, CA (US)

( * ) Notice: Subject to any disclaimer, the term of this patent is extended or adjusted under 35 U.S.C. 154(b) by 194 days.

(21) Appl. No.: 11/653,311

(22) Filed: Jan. 16, 2007

Related U.S. Application Data

(60) Provisional application No. 60/759,076, filed on Jan. 17, 2006.

(51) Int. Cl.
G06F 17/30 (2006.01)
G06F 17/00 (2006.01)

(52) U.S. Cl. .................. 707/769; 707/698; 707/706; 707/747

(58) Field of Classification Search .................. None
See application file for complete search history.

(56) References Cited

U.S. PATENT DOCUMENTS

| 6,119,124 | A * | 9/2000 | Broder et al. ........... 707/103 R |
| 6,366,954 | B1 * | 4/2002 | Traversat et al. ........... 709/220 |
| 6,516,337 | B1 | 2/2003 | Tripp et al. |
| 6,638,314 | B1 | 10/2003 | Meyerzon et al. |
| 6,807,569 | B1 | 10/2004 | Bhimani et al. |
| 7,139,756 | B2 | 11/2006 | Cooper et al. |
| 2005/0209876 | A1 * | 9/2005 | Kennis et al. ........... 705/1 |
| 2007/0011450 | A1 * | 1/2007 | McCreight et al. ........... 713/165 |

* cited by examiner

Primary Examiner—Greta L Robinson
Assistant Examiner—James J Wilcox
(74) Attorney, Agent, or Firm—Schwegman Lundberg & Woessner, P.A.

(57) ABSTRACT

Documents can be searched for, and include a keyword value set, that is at least a key and a value corresponding to the key. The documents store (i) a machine identifier corresponding to the computer storing the document, and (ii) a digital fingerprint calculated from the keyword value set. The documents are indexed into a search index that includes digital fingerprints for the keyword value sets. The machine identifier includes a configuration, attributes and a name of the computer. Search criteria are received that specifies a keyword string including a key and a value corresponding to the key. A digital fingerprint is calculated from the key and the value. A search is conducted for documents which include the digital fingerprint, including referencing a search index having the digital fingerprint to locate the documents. Search results are returned and can indicate the documents and/or respective machine identifiers stored in the document(s).

12 Claims, 6 Drawing Sheets

COMPUTER-IMPLEMENTED METHOD AND DEVICE FOR PROVIDING SECURITY ON A COMPUTER NETWORK

RELATED APPLICATIONS

This application claims priority to U.S. Provisional Patent Application No. 60/759,076, filed Jan. 17, 2006, which is expressly incorporated herein by reference.

BACKGROUND OF THE INVENTION

1. Field of the Invention

The invention relates to electronic searching for one or more documents storing a digital fingerprint, where the digital fingerprint is created from the document's key and value for the key. Optionally, an aspect of the invention relates to using such a search in connection with computer security management.

2. Description of the Related Art

One of the greatest challenges to any computer security professional today is having access to critical pieces of information about the computers and networks he or she is trying to protect at the moment the latest vulnerability is announced. In a typical enterprise, there are numerous disparate information technology and security products that provide visibility into what assets an organization may have, how they are configured, their patch levels, and even perhaps granular information and attributes such as what processes and executables are running.

Nevertheless, it is a struggle to collect a holistic set of data in a timely manner due to the fact that the relevant information is not in a friendly file format, is unstructured and impractical for centralized collection and storage and/or is not practical because of a file's complexity, location, owner or size. Additionally, there is a growing trend to attempt to track a holistic set of data in a configuration management database (CMDB) in accordance with the Information Technology Information Library (ITIL) best practice recommendations. However, the emergent and ever-changing nature of vulnerabilities does not lend itself to readily leveraging the CDMB as the central authoritative source for rapid assessment and mitigation actions.

Further complicating the management challenge is the convergence of security management products and regulatory compliance mandates that require compliance and security professionals to have even greater access to on-demand information. This poses even a greater technical hurdle in that compliance-related data is typically stored across silos in the enterprise by many stakeholders with file formats ranging from email, spreadsheets, PowerPoint™, and various databases.

Content stored in a computer system, the Internet, a corporate or proprietary network, or a personal computer might be located by a search engine in some situations. A typical search engine allows a user to specify search criteria (generally a given word or phrase), and returns as search results a list of documents with content likely meeting the search criteria.

In order to rapidly return the search results, the search engine can use a search index to the documents. Popular search engines focus on the full-text indexing of online, natural language documents; meta search engines reuse the indices of other services and do not store a local index; and partial text services restrict the depth indexed to reduce index size. A conventional search index can be built and maintained by indexing documents into the search index periodically and/or in response to requests to be indexed.

The queries one can make in a conventional search engine are currently limited to searching for keywords which have been indexed. Unfortunately, use of plural keywords may result in many false positives, that is, documents with all of the specified keywords but no real relation to the search. Conventional search engines have limited usefulness for security management.

BRIEF DESCRIPTION OF THE SEVERAL VIEWS OF THE DRAWING(S)

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

DETAILED DESCRIPTION OF THE INVENTION

The following detailed description includes many specific details. The inclusion of such details is for the purpose of illustration only and should not be understood to limit the invention. Throughout this discussion, similar elements are referred to by similar numbers in the various figures for ease of reference. In addition, features in one embodiment may be combined with features in other embodiments of the invention.

In overview, the present disclosure concerns computers and communication networks for use with computers, such as may be associated with networks supporting communication between wireless and/or wire line devices. Such communication networks may provide additional services such as data communications, signal, and/or video services. Computers on such networks can store or have access to various documents. More particularly, various inventive concepts and principles are embodied in systems, devices, and methods therein for providing indexing of documents on computers in a communication network.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to reduce the incidence of false positives returned from a search, optionally for use in more accurately assessing vulnerabilities of computers.

Further in accordance with exemplary embodiments, a digital signature corresponding to the key and the value in a particular document is stored in the document together with a machine identifier specific to the computer storing the document. The digital signature for the document is indexed into a search index. A search for a key and a value can return search results more correctly reflecting documents corresponding to search criteria including the key and the value for that key. Security vulnerabilities can be identified by using the search index together with the machine identifiers.

Figure 1:
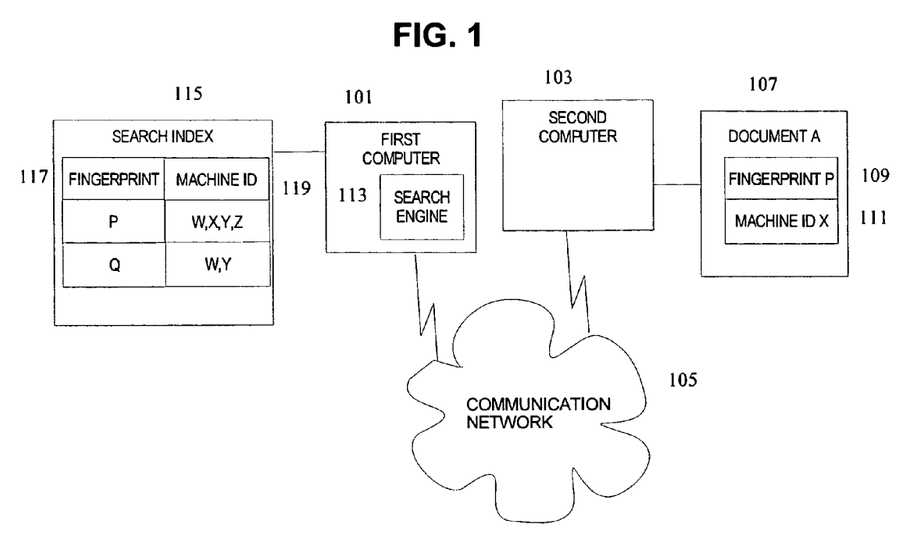
FIG. 1 is a block diagram illustrating a simplified and representative environment associated with a search for documents having a digital fingerprint.

Now referring to the overview provided in connection with FIG. 1, a block diagram illustrating a simplified and representative environment associated with a search for documents having a digital fingerprint which will be discussed and described. A first computer 101 and a second computer 103 can communicate, for example via a communication network 105.

The second computer 103 has access to electronically accessible storage, and the storage contains a document, document A 107. The content of the document is not necessarily limited, and can be, for example, text, database, executable computer program, image files, audio files, movie clips, or the like. Document A 107 can include a keyword value set, which is at least a key and a value for the key. The items comprising the keyword value set, that is the key and/or the value for the key can anywhere in the document, for example, content of the document, the document header, the document name, the document extension, or the like. The key and the value can be stored adjacent to each other, but alternatively may be separated.

As one example, consider that document A 107 is a Windows® registry on the first computer 101; a Windows® registry is one or more files which stores user settings and options for a particular computer, and is used by various Windows® operating systems. The registry, document A 107 includes one or more character strings sometimes referred to as registry keys. In Microsoft® Windows®, a registry key is used to store configuration information as a value. Other operating systems utilize files referred to by other names, such as a "property list file" or "configuration file" to store user settings and options. Hence, as used herein "key" refers to such registry keys for Windows® systems or similar for alternative systems; and "value" refers to permissible data stored in a particular key.

In this example, consider that the registry key for document A 107 is "HKEY_LOCAL_MACHINE/SOFTWARE/Adobe/Acrobat Reader \7.0.6", thus indicating that the first computer 101 can run Adobe Acrobat Reader® version 7.0.6. The version number (in this example, "7.0.6") is the value for the key, and the character string preceding the version number (in this example, "HKEY_LOCAL_MACHINE/SOFTWARE/Adobe/Acrobat Reader") is the key.

The document 107, document A, includes a digital fingerprint 109, fingerprint P which corresponds to the key and the value of the key. One or more digital fingerprints 109 corresponding to different keys and their respective values can be included in a particular document. The document 107 also includes a machine identifier 111. The machine identifier identifies the computer on which the document is stored, and is discussed in more detail below. Document A is representative of any number of documents 107 which can be accessible from the second computer 103. It is understood that the second computer 103 is representative of any number of computers that can be in communication.

The first computer 101 includes a search engine 113, illustrated in a simplified format. The search engine 113 has access to a search index 115. The simplified representation in FIG. 1 illustrates the search index 115 as an inverted index where a fingerprint 117 can be located to determine one or more machine identifiers 119 which have the fingerprint. In the illustrated example, fingerprint P is associated with machine identifiers W, X, Y and Z; and fingerprint Q is associated with machine identifiers W and Y.

In operation, the search engine 113 can receive a request to locate machines with documents having a particular key and value for the key, such as: key of HKEY_LOCAL_MACHINE/SOFTWARE/Adobe/Acrobat Reader, value of: 7.0.6. The key and the value are input to a hash function to determine the fingerprint value (here represented by "Fingerprint P"). Then, the search index 115 is searched to locate fingerprint 117 P, which lists machine identifiers 119 W, X, Y, Z. The search results can list the machine identifiers for W, X, Y, Z.

One or more embodiments provide that the search results can include listings of the documents and/or links to the documents and/or computer names. Accordingly, the search results can accurately identify machines W, Z, Y and Z as having Adobe Acrobat Reader® version 7.0.6. This can be useful, for example, for replacing documents with updated documents. In addition, the machine identifier (as explained below) can include configuration information and attributes; therefore, one can further determine whether the particular document on a machine with that configuration and attributes is a problem (e.g., poses a vulnerability such as needing remediation or being out of compliance).

The fingerprint 109 and/or machine identifier 111 can be added to the document 107 upon creation of the document 107 and/or later, for example upon request. Alternatively, the fingerprint 109 can be added to the document 107 when the document 107 copied from another computer.

The document 107 can be indexed into the search index using any known or conventional technique for indexing documents into a search index. However, in this instance, the fingerprint 109 is indexed. The machine identifier 111 or an indication of the machine identifier 111 (such as a pointer into a table of machine identifiers 111) may be stored in the search index when the document 107 is indexed.

Accordingly, one or more embodiments provides a computer-implemented method, device and/or system for searching for specified information stored in documents on a plurality of computers in a communication network, the documents including a keyword value set, the keyword value set comprising at least a key and a value corresponding to the key. The documents can store (i) a machine identifier corresponding to the respective computer storing the document, and (ii) a digital fingerprint calculated from the keyword value set according to a hash function. The documents are indexed into a search index that includes digital fingerprints for a plurality of keyword value sets. The machine identifier includes a configuration, attributes and a name of the respective computer.

Figure 2:
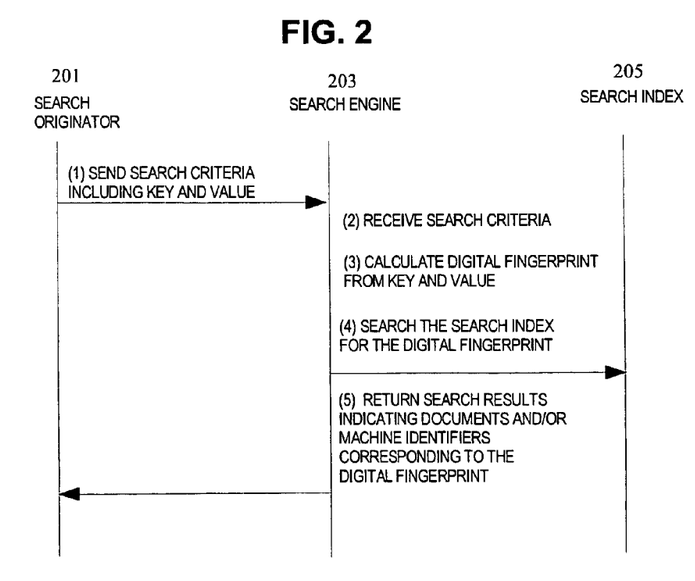
FIG. 2 is a diagram illustrating a flow of information in the search for documents having the digital fingerprint.

Referring now to FIG. 2, a diagram illustrating a flow of information in the search for documents having the digital fingerprint will be discussed and described. FIG. 2 illustrates a search originator 201, a search engine 203, and a search index 205. The search originator 201 sends 1 the search criteria including the key and the value, to the search engine 203.

The search engine 203 receives 2 the search criteria. The search engine 203 then calculates 3 the digital fingerprint from the key and the value. Then, the search engine 203 searches 4 the search index 205 for the digital fingerprint. When the digital fingerprint is located, the search engine 203 returns 5 the search results to the search originator 201, where the search results indicate documents and/or machine identifiers corresponding to the digital fingerprint.

The use of the digital fingerprint in the search index, where the digital fingerprint is calculated from the key and the value, limits the number of false positives returned in the search results. That is, the search results are based on documents having the requested key as a key, and the requested value stored for the key. For example, the search should not return search results listing a document merely having a character string which is identical to the combined key and value but is not a key and value.

Accordingly, one or more embodiments can provide for receiving search criteria, wherein the search criteria specifies a keyword string including a key and a value corresponding to the key. Such embodiment(s) can include calculating a digital fingerprint from the key and the value according to the hash function. Also, such embodiment(s) can include searching for documents including the digital fingerprint, the searching including referencing a search index having the digital fingerprint to locate documents indexed in the search index as corresponding to the digital fingerprint. Further, such embodiment(s) can include returning search results from the searching, the search results indicating the documents and respective machine identifiers stored in the document.

Figure 3:
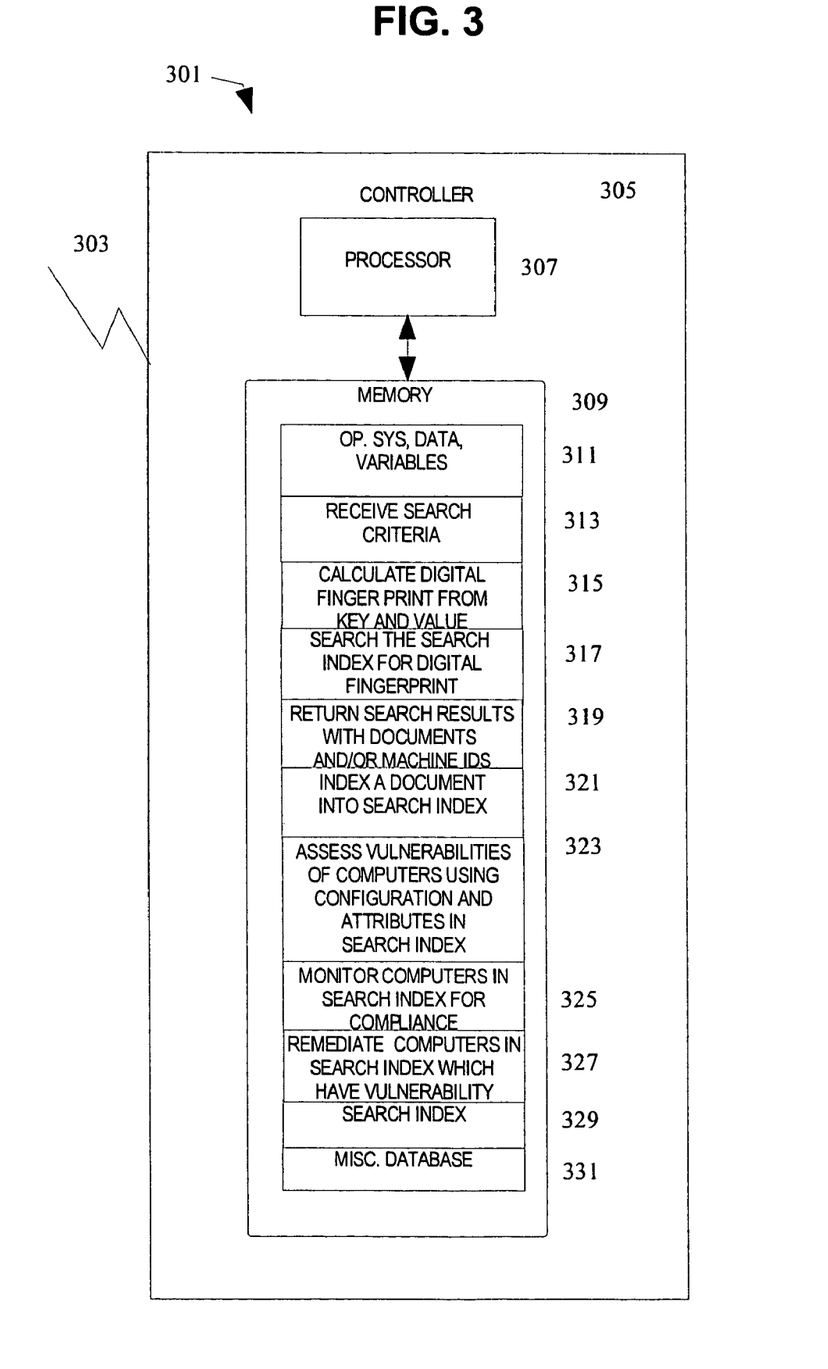
FIG. 3 is a block diagram illustrating portions of an exemplary computer used for providing searches for documents having digital fingerprints.
Figure 4:
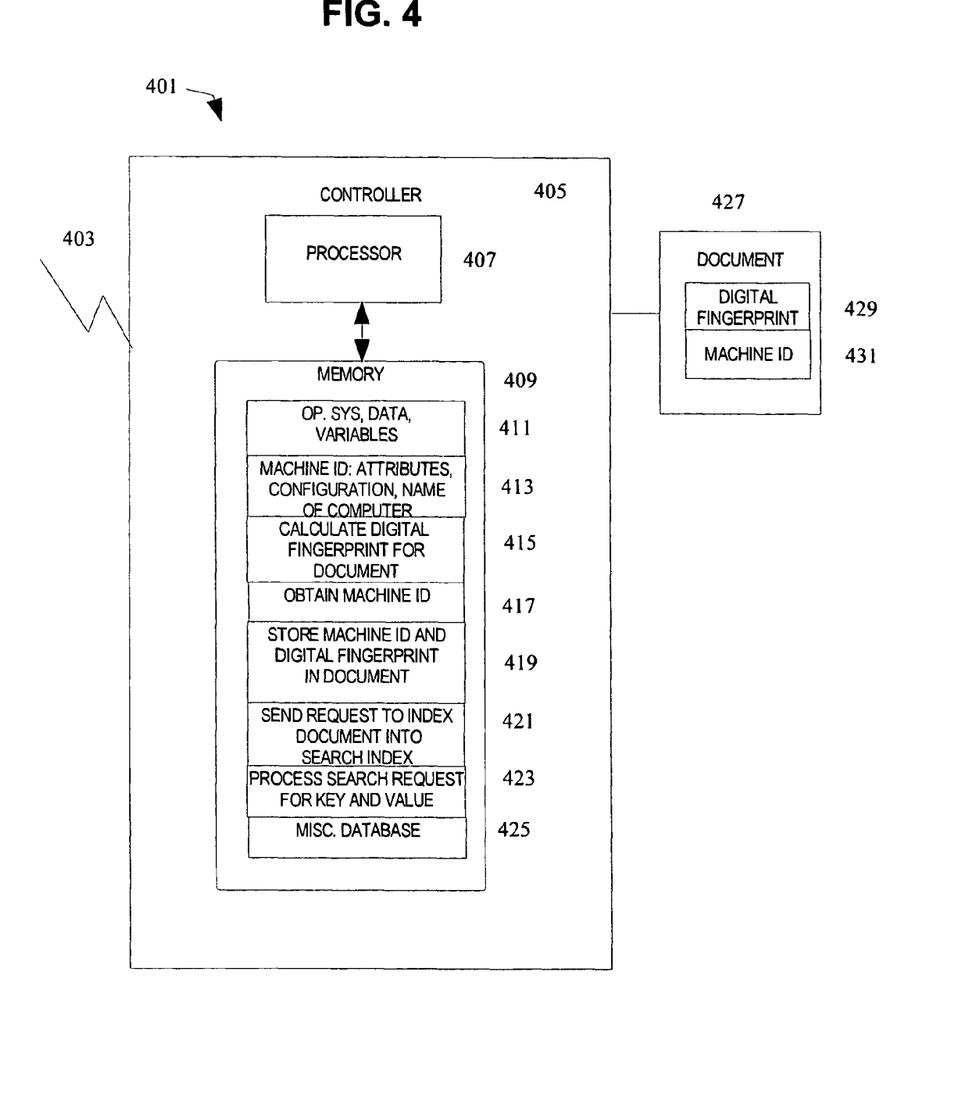
FIG. 4 is a block diagram illustrating portions of an exemplary computer used for storing the digital fingerprint into a document.

FIG. 3 and FIG. 4 provide illustrations of computers used in connection with searching for documents. FIG. 3 is directed to a computer which controls the search index (including searching the index) and which controls vulnerability assessments, compliance monitoring, and remediation. FIG. 4 is directed to a computer which has one or more documents to be located by a search, and which may submit a search request.

Referring now to FIG. 3, a block diagram illustrating portions of an exemplary computer used for providing searches for documents having digital fingerprints will be now discussed and described. The computer 301 may include one or more communication links 303 for communication with an external device or communications network, and one or more controllers 305. The controller 305 can include a processor 307, and a memory 309. Optionally, the computer 301 can communicate with or be connected to a display (not illustrated), a user input device such as a keyboard, and/or other optional devices.

The processor 307 may comprise one or more microprocessors and/or one or more digital signal processors. The memory 309 may be operably coupled to the processor 307 and may comprise a read-only memory (ROM), a random-access memory (RAM), a programmable ROM (PROM), and/or an electrically erasable read-only memory (EEPROM). The memory 309 may include multiple memory locations for storing, among other things, an operating system, data and variables 311 for programs executed by the processor 307; computer programs for causing the processor to operate in connection with various functions such as receiving 313 search criteria, calculating 315 a digital fingerprint from a key and value, searching 317 the search index for the digital fingerprint, returning 319 the search results with documents and/or machine identifiers, and/or indexing 321 a document into the search index; a search index 329; and a database 331 for other information used by the processor 307. Optionally, the processor 307 may be programmed for additional functions, such as assessing 323 vulnerabilities of computers using configuration and attributes from the search index 329, monitoring 325 computers in the search index for compliance, and/or remediating 327 computers in the search index which have a vulnerability.

The computer programs may be stored, for example, in ROM or PROM and may direct the processor 307 in controlling the operation of the computer 301.

The processor 307 may be programmed for receiving 313 search criteria. Search criteria can be provided via any convention means, for example, received from a search request via the communication link 303, or via a user input device (not illustrated) such as a keyboard. The search criteria can be received as a combination of key and value therefore. Optionally, the processor 307 can verify that the key and value are correct, that is, the key is a permitted key and the value is of the type and within the ranged permitted for the key.

The processor 307 may be programmed for calculating 315 a digital fingerprint from a key and value. Having received the key and the value, the digital fingerprint can be calculated by applying a hash function to the key and the value to obtain the digital fingerprint. Hashes and digital fingerprints are discussed in more detail below.

The processor 307 may be programmed for searching 317 the search index for the digital fingerprint. Known techniques can be utilized for searching the search index 329 for the digital fingerprint. For example, if the search index 329 is provided as an inverted index, the digital fingerprint is located, and the machine identification(s) is (are) listed in a table or tree as corresponding to the digital fingerprint. Optionally, the search index 329 lists pointers or links to the machine identifications, which is useful if storage in the search index 329 is an issue.

The processor 307 may be programmed for returning 319 the search results with documents and/or machine identifiers or portions thereof. That is, when the search results are located, they can be returned. The search results can include the machine identifiers corresponding to the digital fingerprint calculated from the search criteria. If the search index 329 includes links to documents (for example, if they are cached or stored on a network), then links to the documents can be included in the search results.

The processor 307 may be programmed for indexing 321 a document into the search index. For example, the computer 301 may receive a request, where the request indicates a particular document to be indexed, or where a default document (for example, a configuration file) is to be indexed. The request can include the key and the value, or the document having the key and the value, or the location of the document to be indexed, as well as the machine identifier. The key, the value, and the machine identifier can be retrieved from the request or from the document. Then, the processor 307 can calculate the digital fingerprint from the key and value as described above, and add the digital fingerprint and the machine identifier to the search index 329. The processor 307 can insert the digital fingerprint and/or machine identifier into the document, if they are not already stored in the document. Alternatively, the processor 307 can return the digital fingerprint so that the entity that requested the indexing can insert the digital fingerprint and/or machine identifier into the document.

The processor 307 may be programmed for assessing 323 vulnerabilities of computers using configuration and attributes from the search index 329. The machine identifiers stored in connection with the search index 329 include an indication of configuration and attributes. The configuration and attributes that are to be included in the machine identifier can be selected by an administrator, typically to reflect information that is used to determine if a computer has a particular vulnerability. Such information typically includes at least registry information, or a portion thereof. A vulnerability is information typically disseminated in electronic format by an organization in accordance with known techniques, and indicates the configuration and attributes that are vulnerable, as well as methods for remediation.

Accordingly, the search index 329 can be reviewed to compare configuration and attributes of computers to a particular vulnerability to determine which computers have the particular vulnerability. A list of computers with the particular vulnerability can be returned as search results. Optionally, the vulnerability can specify a key and a value, such as a particular software and version. Accordingly, the digital fingerprint for the key and value can be calculated, and the search index 329 can be searched to locate computers corresponding to the digital fingerprint. Optionally, the key and value as well as the configuration and/or attributes can be specified in the vulnerability, and used to determine if a computer has a vulnerability. For example, a computer having a certain version of particular software might only be vulnerable if the computer has certain configuration and attributes. A list of machine identifiers (or portion thereof, e.g., computer names) for computers with the particular vulnerability can be returned as search results.

Accordingly, one or more embodiments can provide for assessing whether the configuration and attributes in the respective computer are associated with a vulnerability, wherein the vulnerability identifies a configuration and attributes, and wherein the assessing includes comparing the configuration and attributes in the respective machine identifier to the configuration and attributes identified in the vulnerability.

The processor 307 may be programmed for monitoring 325 computers in the search index for compliance. For example, the processor 307 can periodically compare the machine identifiers listed in the search index 329 to known vulnerabilities. This can be particularly useful if the configuration or attributes of a computer have changed since the last assessment for a vulnerability, whereupon the computer may become vulnerable. Accordingly, one or more embodiments can provide for automatically monitoring the plurality of computers for compliance.

The processor 307 may be programmed for remediating 327 computers in the search index which have a vulnerability. Computers which have been identified as being vulnerable, for example using a process described herein, can begin execution of an automated remediation which can be specified in the vulnerability. Accordingly, one or more embodiments provides that the vulnerability further specifies a remediation process, and further comprising operating the remediation process on the named machines in the respective machine identifiers if the respective computer is assessed as having the vulnerability.

Referring now to FIG. 4, a block diagram illustrating portions of an exemplary computer 401 used for storing the digital fingerprint into a document will be discussed and described. Descriptions of portions of the computer 401 may be similar to that of the computer 301 described in connection with FIG. 3 and thus will be abbreviated or omitted. The computer 401 may include one or more communication links 403 for communication with an external device or communications network, and one or more controllers 405. The controller 405 can include a processor 407, and a memory 409. Optionally, the computer 401 can communicate with or be connected to a display (not illustrated), a user input device such as a keyboard, and/or other optional devices.

The processor 407 may comprise one or more microprocessors and/or one or more digital signal processors. The memory 409 may be operably coupled to the processor 407 and may comprise ROM, RAM, PROM, and/or EEPROM. The memory 409 may include multiple memory locations for storing, among other things, an operating system, data and variables 411 for programs executed by the processor 407; computer programs for causing the processor to operate in connection with various functions such as calculating 415 a digital fingerprint for a document, obtaining 417 a machine identifier, storing 419 the machine identifier and digital fingerprint in the document, sending 421 a request to index the document into the search index, and/or processing 423 a search request for a key and a value; and a database 425 for other information used by the processor 407. The processor 427 can have access to a document 427 stored in local or remote memory. The document 427 can include a digital fingerprint 429 and machine identifier 431, as described herein.

The processor 407 may be programmed for calculating 415 a digital fingerprint for a document. Calculation of a digital fingerprint is adequately discussed elsewhere in this document, and will not be repeated here to avoid obscuring the discussion.

The processor 407 may be programmed for obtaining 417 a machine identifier. The contents of the machine identifier can be obtained from the machine's memory. For example, the computer name, the type of computer, and the type of the operating system can be retrieved from the known location for the particular type of machine, together with desired attributes. The processor 407 may determine the type of computer in order to properly determine the location of the configuration, computer name, and attributes.

The processor 407 may be programmed for storing 419 the machine identifier and digital fingerprint in the document. For example, once the machine identifier and a digital fingerprint for a particular document are obtained, the processor 407 can store these as data in the document, either as content or in the document header.

The processor 407 may be programmed for sending 421 a request to index the document into the search index. For example, the processor 407 can include a user interface for the request, where the user interface interacts with a user to input a document. When the document is identified, the request can be transmitted so that the document is indexed into the search index by its digital fingerprint. The request to index the document can also be programmed to obtain and store the machine identifier and the digital fingerprint for key(s) and the value corresponding to the key in the document. If the document already includes a digital fingerprint for the key and value, such as might happen if the document is a copy, it is not necessary to store the digital fingerprint again.

Accordingly, one or more embodiments can include, in response to a request to index a particular document, wherein the particular document does not have stored therein the digital fingerprint corresponding to the key and the value, calculating the digital fingerprint from the key and the value stored in the particular document, according to the hash function; obtaining the machine identifier for the particular computer; storing the digital fingerprint and the machine identifier in the particular document; and/or indexing the particular document into the search index.

The processor 407 may be programmed for processing 423 a search request for a key and a value. For example, the processor 407 can include a user interface for the search engine, where the user interface interacts with a user to input search criteria which includes both a key and a value for the key. When the search criteria are input, the search request can be transmitted so that the search index is searched.

It is expected that the functions performed by the respective computers described in connection with FIG. 3 and FIG. 4 will be symmetrical; that is, where the computer that updates the index expects certain information, the computer requesting that a document be inserted in the index can pass the expected information. Furthermore, one of skill in the art will appreciate that various functions may be distributed differently, such as among three or more computers, or that various functions may be omitted from computers.

Also, it should be understood that various embodiments are described herein in connection with logical groupings of functions. One or more embodiments may omit one or more of these logical groupings. Likewise, in one or more embodiments, functions may be grouped differently, combined, or augmented. Similarly, various databases or collections of data and information are described herein. One or more groupings of the data or information may be omitted, distributed, combined, or augmented, or provided locally and/or remotely without departing from the scope of the invention.

Figure 5:
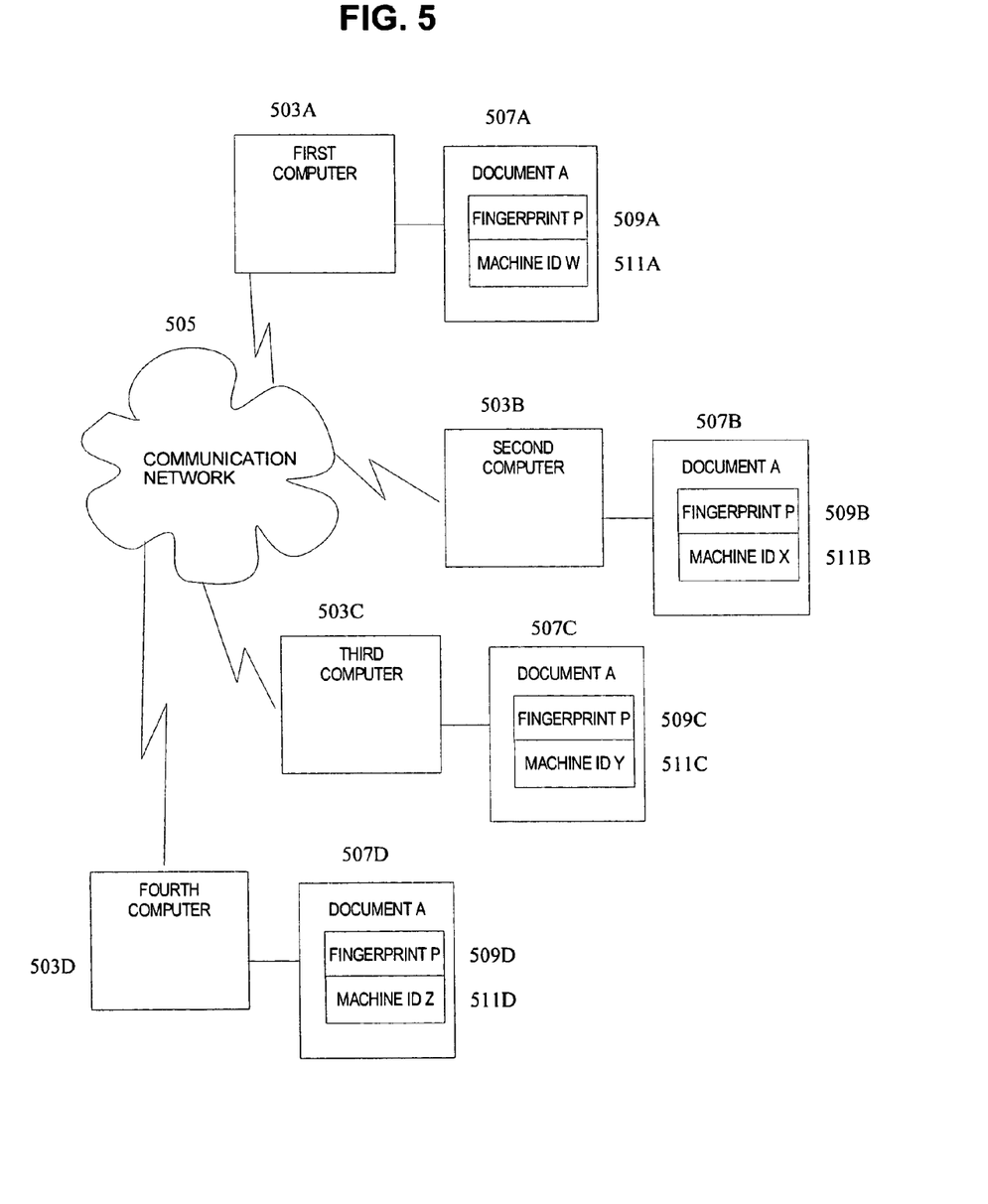
FIG. 5 is a block diagram illustrating a representative computer network having a document stored on multiple computers.

Referring now to FIG. 5, a block diagram illustrating a representative computer network having a document stored on multiple computers will be discussed and described. The following are illustrated in FIG. 5: computers including first through fourth computers (503A-503D), document A on the respective computers (507A-507D), and a communication network 505. The computers (503A-503D) can communicate via communication links to the communication network (505).

In this representative illustration, each of the computers (503A-503D) has access to its own copy of the document A (507A-507D). Document A may have originated as, for example, a text document copied from another computer or a executable software distributed by a software company, or some other way which is irrelevant to this discussion. Accordingly, one or more embodiments provides that the document is executable software, the key identifies a name of the executable software, and the value is a release identifier corresponding to the executable software.

On each computer, the respective document A (507A-507D) has the same particular key and value for the corresponding particular key. (For simplicity, the document is illustrated as having one key and corresponding value; however this key is representative of any number of keys and their respective values.) Therefore, the respective document A (507A-507D) has the same fingerprint P (509A-509D). However, the machine identifiers (511A-511D) include computer names, configuration information and attributes obtained from each computer (503A-503D). Because at least the computer name should be different for each computer, the machine identifiers (511A-511D) on each computer (503A-503D) should be different. Moreover, the computers (503A-503D) may be entirely different types of machines, such that the configuration information and attributes are different on each computer (503A-503D).

A vulnerability assessment can be performed, for a vulnerability which (for the sake of this simple example) may specify that an updated document A must be downloaded but only to machines of a particular type, i.e., having a particular configuration. Accordingly, the search index can be searched for machines with that particular configuration that also have document A. Those machines listed in the search results can then be remediated to load the updated document A, or can be shut down, or other appropriate action can be taken. The search described herein can utilize the combination of machine identifier (including configuration) as well as locating a document with great accuracy, so that vulnerability assessments and remediations can be improved.

Figure 6:
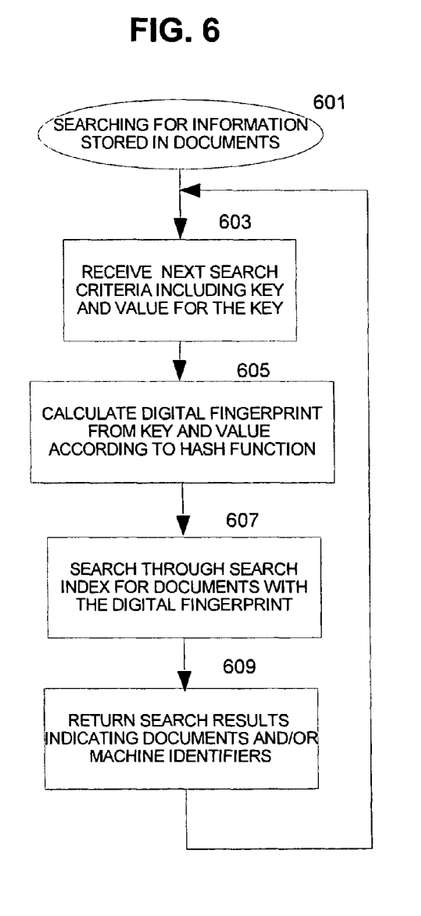
FIG. 6 is a flow chart illustrating an exemplary procedure for searching for information stored in documents.
Figure 7:
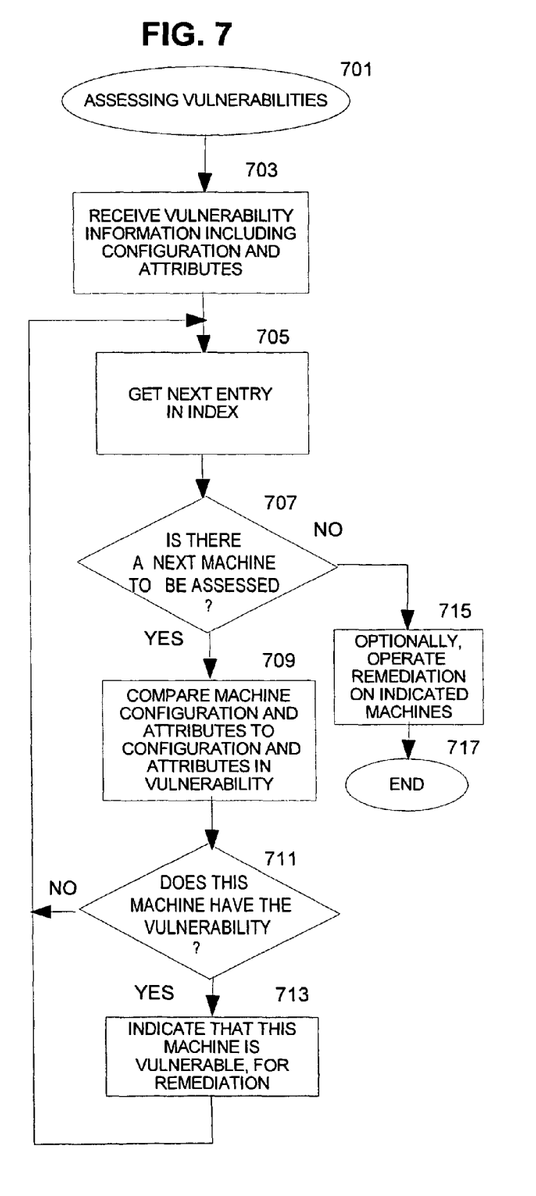
FIG. 7 is a flow chart illustrating an exemplary procedure for assessing vulnerabilities.
Figure 8:
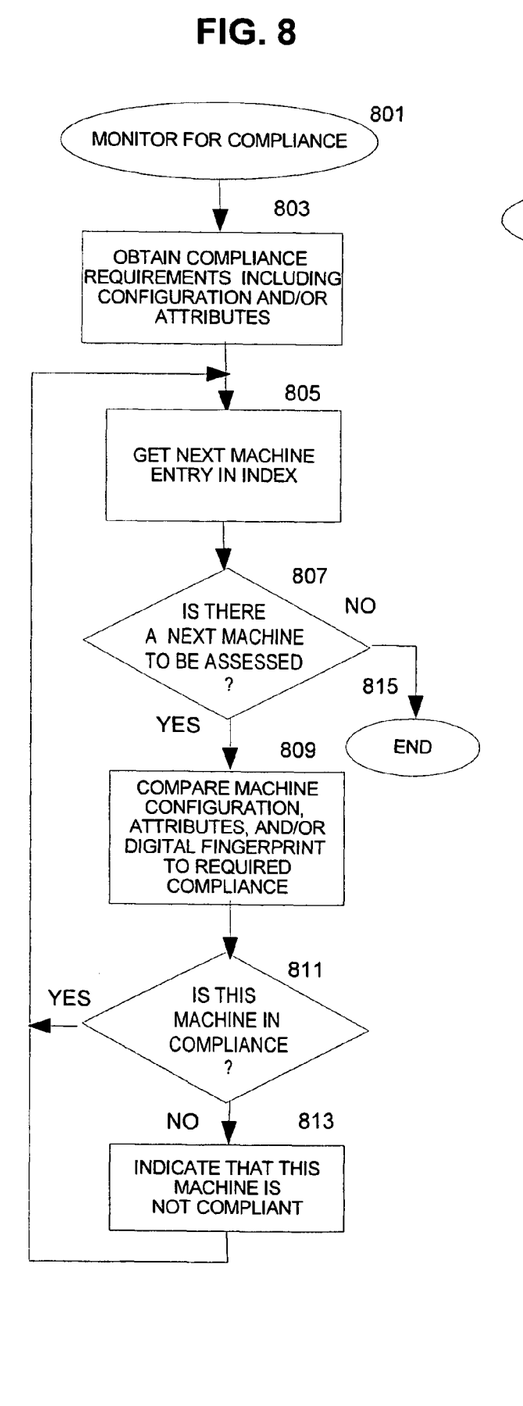
FIG. 8 is a flow chart illustrating an exemplary procedure for monitoring for compliance.
Figure 9:
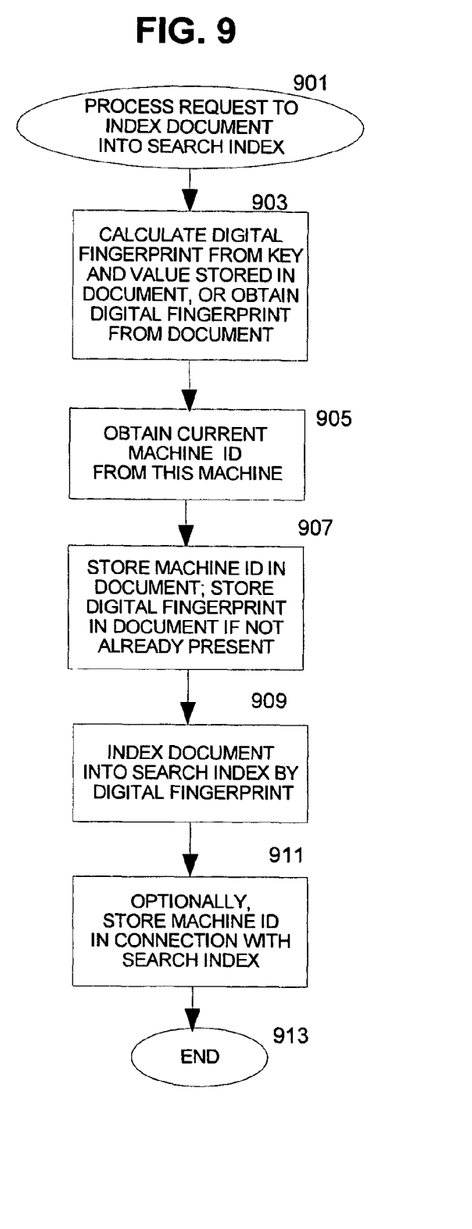
FIG. 9 is a flow chart illustrating an exemplary procedure for processing a request to index a document into a search index.

FIG. 6, FIG. 7, FIG. 8, and FIG. 9 provide flow charts for illustrative procedures. FIG. 6 illustrates a search process, FIG. 7 illustrates a process for assessing vulnerabilities, FIG. 8 illustrates a process for monitoring for compliance, and FIG. 9 illustrates a process for indexing a document into the search index. Each of these procedures can advantageously be implemented on, for example, a processor of a controller, described in connection with FIG. 3 or other apparatus appropriately arranged. Also, portions illustrated in these figures may be implemented on a processor of the controlled described in connection with FIG. 4 or other apparatus appropriately arranged. Much of this discussion will be abbreviated to avoid confusion with discussions elsewhere in this document.

Referring now to FIG. 6, a flow chart illustrating an exemplary procedure 601 for searching for information stored in documents will be discussed and described. In overview, the process can include receiving 603 the next search criteria including a key and a value corresponding to the key; calculating 605 a digital fingerprint from the key and the value according to a hash function; searching 607 through the search index for documents that have the digital fingerprint; and returning 609 search results indicating documents or machine identifiers. These are described in some more detail below.

The procedure 601 can include receiving 603 the next search criteria including a key and a value corresponding to the key, as discussed for example above. Then, the procedure 601 can include calculating 605 a digital fingerprint from the key and the value according to a hash function.

The procedure 601 can include searching 607 through the search index for documents that have the digital fingerprint. The search index can be search in accordance with known techniques, to locate the digital fingerprint. Machine identifiers that corresponding to the digital fingerprint, and/or documents that correspond to the digital fingerprint, can be provided as search results. Then, the procedure 601 can include returning 609 the search results, where the search results indicate documents and/or machine identifiers (or portion thereof).

Referring now to FIG. 7, a flow chart illustrating an exemplary procedure 701 for assessing vulnerabilities will be discussed and described. In overview, the procedure 701 can include receiving 703 vulnerability information; getting 705 the next machine from the entry in the index; determining whether 707 there is a next machine to be assessed; if there is another machine, then comparing 709 the machine configuration and attributes to the vulnerability's configuration and attributes; if the machine 711 has the vulnerability, indicating 713 that the machine is vulnerable, for remediation. When there are no more machines to be assessed, then optionally 715 the procedure can perform remediation on the machines which were indicated as vulnerable. Each of these is discussed in some more detail below.

The procedure 701 can include receiving 703 information on a vulnerability, for example distributed from a manufacturer. Information included in the vulnerability is described herein. The procedure 701 can then compare the machine identifiers to the vulnerability, in order to assess which machines might be vulnerable.

Thus, the procedure 701 can search through the index machine by machine. For example, the procedure 701 can include getting 705 the next machine identifier from the entry in the search index; the procedure 701 can track machine identifiers which it has already evaluated. Alternatively, if the search index utilizes links to machine identifiers, a list of the machine identifiers can be searched. To loop through the index, the procedure 701 can include determining whether 707 there is a next machine to be assessed.

If there is another machine identifier to be assessed, then the procedure 701 can assess whether the machine is vulnerable. For example, the procedure 701 can compare 709 the configuration and attributes of the machine identifier to the vulnerability's configuration and attributes. Other examples have been previously discussed herein.

If the machine 711 has the vulnerability, the procedure can indicate 713 that the machine is vulnerable, so that the vulnerability can be properly remediated. Alternatively, the procedure 701 can automatically perform a remedation of the machine.

When there are no more machine identifiers to be assessed, then optionally 715 the procedure can perform remediation on the machines which were indicated as vulnerable. Processing then can end 717.

Referring now to FIG. 8, a flow chart illustrating an exemplary procedure 801 for monitoring for compliance will be discussed and described. In overview the procedure 801 can include obtaining 803 compliance requirements including configuration and/or attributes; then looping through the machine identifiers in the search index to determine if the machines are compliant. More particularly, the procedure 801 can get 805 the next machine entry in the index; if 807 there is a next machine to be assessed, the procedure can compare 809 the machine configuration, attributes, and/or digital fingerprint to the required compliance parameters; if 811 the machine is not in compliance, then the procedure can indicate 813 that this machine is not compliance. These steps are described in additional detail below.

The procedure 801 can include obtaining 803 compliance requirements including configuration and/or attributes. For example, compliance parameters can be stored which indicate a proper configuration, attributes, and/or keys and values for particular machines.

The procedure 801 can include looping through the machine identifiers in the search index to determine if the machines are compliant with the compliance requirements. More particularly, the procedure 801 can get 805 the next machine entry in the search index, or if the search index utilizes links to the machine identifiers, the procedure can get the next machine entry in the machine identifier list. If 807 there is a next machine to be assessed, the procedure can compare 809 the machine configuration, attributes, and/or digital fingerprint to the required compliance parameters.

The procedure 801 can include, if 811 the machine is not in compliance, then indicating 813 that this machine is not in compliance. When there is no other machine entry in the index, processing can end 815. Thus, the procedure 801 can return a list of non-compliant machines, and an operator or automated program can take appropriate steps to remedy the non-compliance.

Referring now to FIG. 9, a flow chart illustrating an exemplary procedure 901 for processing a request to index a document into a search index will be discussed and described. This procedure 901 can generally include calculating 903 a digital fingerprint from the key and the value stored in the document, or obtaining the digital fingerprint from the document; obtaining 905 the current machine identifier; storing 907 the machine identifier and digital fingerprint in the document; indexing 909 the document into the search index; and optionally, storing the machine identifier in the search index. Each of these is further described below.

Upon receiving a request to index a document into the search index, the process can calculate 903 a digital fingerprint from the key and the value stored in the document. Alternatively, if the digital fingerprint is already stored in the document, the process 901 can obtain the digital fingerprint from the document.

Also, in order to store the machine identifier into the document, the process can obtain 905 the current machine identifier. This has been described above.

The machine identifier can be stored 907 into the document. If the digital fingerprint is not already stored in the document, the digital fingerprint also may be stored in the document.

Then the procedure can index 909 the document into the search index utilizing the digital fingerprint. Techniques for indexing documents into the search index are described above. Optionally 911, the procedure can store the machine identifier in the search index, and/or store the machine identifier in a table or list of machine identifiers and store links to the machine identifiers in the table/list in the search index. Processing can then end 913.

It should be noted that the term "computer" may be used interchangeably herein with the term "machine" or the like. Examples of computers include a general purpose computer, a specially programmed special purpose computer, embedded computers, personal digital assistants, personal assignment pads, sophisticated calculators, hand held computers, laptop/notebook computers, super computers, personal computers, as well as processing system network combinations of the same. A communications link used by a computer to communicate externally may be a dedicated link, a modem over a POTS line, and/or any other method of communicating between computers. Moreover, the processing could be controlled by a software program on one or more computer systems or processors, or could even be partially or wholly implemented in hardware.

Furthermore, it should be noted that the communication networks of interest include, by way of example, the Internet, intranets, local area networks (LAN), wireless LANs (WLAN), wide area networks (WAN), and others. Protocols supporting communication networks include one or more of various networking protocols, and other wireless application protocols or wireline application protocols and/or other protocol structures, and variants and evolutions thereof. Such networks can provide wireless communications capability and/or utilize wireline connections such as cable and/or a connector, or similar.

The designation "configuration" as used herein refers to an identification of the components on the computer, including hardware (for example, type (model) of computer, type of processor, processor speed, type of memory, amount of memory, cache, type of peripherals, ports, and the like), network information (for example, type of network hardware, interne protocol addresses, router, subnet mask, configuration method, DNS, proxies, MAC address, and the like), and software (for example, operating system/version, kernel type/version, boot volume and the like). As the term configuration is used herein, can include a subset of the foregoing.

A computer name, also referred to herein as a name, is conventionally required by a communications network (Windows and Apple, for example, refer to this as "computer name"). A typical network requires the computer name to be unique within the network. Because many networks allow a computer to be connected at various nodes within the network, the computer name is not necessarily limited to a particular node within the network.

Attributes is used herein to refer to an identification of security settings on the computer, for example, local policy settings, domain policy settings, domain controller policy settings, file permissions, the results of running of certain programs or queries, and the like.

"Machine identification," as used herein, includes the computer name, configuration, and attributes. The combination of computer name, configuration and attributes has a high likelihood of uniquely identifying a particular computer.

A search index stores a list of occurrences for each digital fingerprint, for example as a hash table or a binary tree. More particularly, the search index can be an inverted index. An inverted index can store a list of the documents for each digital fingerprint. A search engine can retrieve the matching documents using direct access to find the documents for a digital fingerprint. An augmented index or augmented search index refers herein to an index that includes the basic search index (i.e., digital fingerprint and document location), augmented by machine id (or subset of machine id information). The term "document" used herein can include text files, non-text files, databases, video files, audio files, data files, whether stored remotely, on a peripheral or in local memory.

The designation "search results" refers to the items matching the search criteria found as a result of a successful search of a search engine. This is sometimes referred to as a "hit list" or "results list". Search results, as used herein, can refer to the document and/or to the machine id (or portions thereof).

The term "digital fingerprint" is used herein to indicate the output of a hash function, optionally with additional security properties. A hash function takes a string of any length as input and produces a fixed length string as output, which can be used as a digital fingerprint.

A hash function is intended to take input and produce output of known size which has a low chance of collision. Various techniques are known and can be used as hash functions. Examples of hash functions include MD5 (message digest algorithm 5), SHA-1 (secure hash algorithm-1), and variants thereof. Any known hash function or derivations or improvements thereof can be used.

A vulnerability refers to a weakness in a system allowing an attacker to violate the integrity, confidentiality, access control, availability, consistency or audit mechanisms of the system or the data and applications it hosts. As used herein, "vulnerability" refers to an indication of the computer configuration and computer attributes corresponding to the vulnerability, and an indication of the remediation to solve the vulnerability. In addition, "vulnerability" encompasses compliance, that is, a required limitation to a machines configuration and/or attributes (such as an automatic logoff timer) as is understood in the industry. The indication of the remediation can include conventional text descriptions, automated processes, or combination thereof.

The invention may include a process and/or steps. Where steps are indicated, they may be performed in any order, unless expressly and necessarily limited to a particular order. Steps that are not so limited may be performed in any order.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer-implemented method for searching for registry information stored in registries on a plurality of computers in a communication network, the method comprising:
   (A) receiving search criteria, wherein the search criteria specifies a registry keyword string including a key and a value corresponding to the key;
   (B) calculating a digital fingerprint from the key and the value according to a hash function;
   (C) searching for computers including the digital fingerprint, the searching including referencing a search index having the digital fingerprint to locate computers indexed in the search index as corresponding to the digital fingerprint, wherein:
   the index includes digital fingerprints for a plurality of registry keyword value sets;
   each registry keyword value set is associated with at least one machine identifier;
   the machine identifiers include a configuration, attributes, and a name of each respective computer storing the registry; and
   the search index includes entries corresponding to the registries on the plurality of computers in the communication network, each entry for each registry including:
   a registry keyword value set, the registry keyword value set comprising at least a key and a value corresponding to the key;

a machine identifier corresponding to the respective computer storing the registry; and the digital fingerprint of the registry keyword value set calculated from the registry keyword value set according to the hash function;

(D) returning search results from the searching, the search results indicating the registries and respective machine identifiers including the received search criteria;

(E) for each computer of the returned machine identifiers, assessing whether the configuration and attributes of the computer is associated with a vulnerability, wherein:

the vulnerability identifies a configuration and attributes and specifies a remediation process to remediate the vulnerability; and the assessing includes comparing the configuration and attributes of the computer to the configuration and attributes identified of the vulnerability; and executing the specified remediation process on each computer assessed as having the vulnerability.

2. The method of claim 1, further comprising automatically monitoring the plurality of computers for compliance.

3. The method of claim 1, further comprising, in response to a request to index a particular registry, wherein the particular registry does not have stored therein the digital fingerprint corresponding to the key and the value:

calculating the digital fingerprint from the key and value sets stored in the particular registry, according to the hash function;

obtaining the machine identifier for the particular computer;

storing the digital fingerprint and the machine identifier in the particular registry; and indexing the particular registry into the search index.

4. The method of claim 1, further comprising, in response to a request to index a particular registry, wherein the particular registry has stored therein the digital fingerprint corresponding to the key and the value:

obtaining the machine identifier for the particular computer;

storing the machine identifier in the particular registry; and indexing the particular registry into the search index.

5. A computer-readable storage medium comprising instructions for execution by a computer, the instructions including a computer-implemented method for searching for registry information stored in registries on a plurality of computers in a communication network, the instructions for implementing:

(A) receiving search criteria, wherein the search criteria specifies a registry keyword string including a key and a value corresponding to the key;

(B) calculating a digital fingerprint from the key and the value according to a hash function;

(C) searching for computers including the digital fingerprint, the searching including referencing a search index having the digital fingerprint to locate computers indexed in the search index as corresponding to the digital fingerprint, wherein:

the index includes digital fingerprints for a plurality of registry keyword value sets;

each registry keyword value set is associated with at least one machine identifier;

the machine identifiers include a configuration, attributes, and a name of each respective computer storing the registry; and the search index includes entries corresponding to the registries on the plurality of computers in the communication network, each entry for each registry including:

a registry keyword value set, the registry keyword value set comprising at least a key and a value corresponding to the key;

a machine identifier corresponding to the respective computer storing the registry; and the digital fingerprint of the registry keyword value set calculated from the registry keyword value set according to the hash function;

(D) returning search results from the searching, the search results indicating the registries and respective machine identifiers including the received search criteria; and (E) for each computer of the returned machine identifiers, assessing whether the configuration and attributes of the computer is associated with a vulnerability, wherein:

the vulnerability identifies a configuration and attributes and specifies a remediation process to remediate the vulnerability; and the assessing includes comparing the configuration and attributes of the computer to the configuration and attributes identified of the vulnerability; and executing the specified remediation process on each computer assessed as having the vulnerability.

6. The computer-readable storage medium of claim 5, further comprising instructions for automatically monitoring the plurality of computers for compliance.

7. The computer-readable storage medium of claim 5, further comprising instructions for, in response to a request to index a particular registry, wherein the particular registry does not have stored therein the digital fingerprint corresponding to the key and the value:

calculating the digital fingerprint from the key and value sets stored in the particular registry, according to the hash function;

obtaining the machine identifier for the particular computer;

storing the digital fingerprint and the machine identifier in the particular registry; and indexing the particular registry into the search index.

8. The computer-readable storage medium of claim 5, further comprising instructions for, in response to a request to index a particular registry, wherein the particular registry has stored therein the digital fingerprint corresponding to the key and the value:

obtaining the machine identifier for the particular computer;

storing the machine identifier in the particular registry; and indexing the particular registry into the search index.

9. A computer system for searching for specified information stored in documents on a plurality of computers in a communication network, the computer system comprising:

at least one processor;

at least one memory device;

(A) a search engine held in the at least one memory device and executable by the at least one processor, the search engine configured for (1) receiving search criteria, wherein the search criteria specifies a registry keyword string including a key and a value corresponding to the key;

(2) calculating a digital fingerprint from the key and the value according to the hash function;

(3) searching for computers including the digital fingerprint, the searching including referencing a search index having the digital fingerprint to locate computers indexed in the search index as corresponding to the digital fingerprint, wherein:

the index includes digital fingerprints for a plurality of registry keyword value sets;

each registry keyword value set is associated with at least one machine identifier;

the machine identifiers include a configuration, attributes, and a name of each respective computer storing the registry; and the search index includes entries corresponding to the registries on the plurality of computers in the communication network, each entry for each registry including:

a registry keyword value set, the registry keyword value set comprising at least a key and a value corresponding to the key;

a machine identifier corresponding to the respective computer storing the registry; and the digital fingerprint of the registry keyword value set calculated from the registry keyword value set according to the hash function; and (4) returning search results from the searching, the search results indicating the registries and respective machine identifiers including the received search criteria; and (B) a computer security component held in the at least one memory device and executable by the at least one processor for assessing each computer of the returned machine identifiers, the computer security component executable to:

assess whether the configuration and attributes of the computer is associated with a vulnerability, wherein:

the vulnerability identifies a configuration and attributes and specifies a remediation process to remediate the vulnerability; and the assessing includes comparing the configuration and attributes of the computer to the configuration and attributes identified of the vulnerability; and execute the specified remediation process on each computer assessed as having the vulnerability.

10. The computer system of claim 9, wherein the computer security component is configured for automatically monitoring the plurality of computers for compliance.

11. The computer system of claim 9, further comprising an index component, the index component configured for, in response to a request to index a particular registry, wherein the particular registry does not have stored therein the digital fingerprint corresponding to the key and the value:

calculating the digital fingerprint from the key and value sets stored in the particular registry, according to the hash function;

obtaining the machine identifier for the particular computer;

storing the digital fingerprint and the machine identifier in the particular registry;

and indexing the particular registry into the search index.

12. The computer system of claim 9, further comprising an index component, the index component configured for, in response to a request to index a particular registry, wherein the particular registry has stored therein the digital fingerprint corresponding to the key and the value:

obtaining the machine identifier for the particular computer;

storing the machine identifier in the particular registry;

and indexing the particular registry into the search index.

* * * * *